US010432743B2

(12) United States Patent
Cheng

(10) Patent No.: US 10,432,743 B2
(45) Date of Patent: Oct. 1, 2019

(54) ELECTRONIC DEVICE AND EVENT NOTIFYING METHOD

(71) Applicant: Chiun Mai Communication Systems, Inc., New Taipei (TW)

(72) Inventor: Chien-Hung Cheng, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 121 days.

(21) Appl. No.: 15/683,899

(22) Filed: Aug. 23, 2017

(65) Prior Publication Data

US 2018/0063269 A1 Mar. 1, 2018

(30) Foreign Application Priority Data

Aug. 31, 2016 (CN) .......................... 2016 1 0780310

(51) Int. Cl.
| H04L 29/08 | (2006.01) |
| H04L 12/26 | (2006.01) |
| H04W 36/20 | (2009.01) |
| H02K 33/16 | (2006.01) |
| G06F 3/041 | (2006.01) |
| H04L 12/18 | (2006.01) |
| H04B 17/318 | (2015.01) |

(52) U.S. Cl.
CPC ............ *H04L 67/26* (2013.01); *G06F 3/0416* (2013.01); *H02K 33/16* (2013.01); *H04B 17/318* (2015.01); *H04L 12/189* (2013.01); *H04L 12/1859* (2013.01); *H04L 12/1895* (2013.01); *H04L 43/065* (2013.01); *H04W 36/20* (2013.01)

(58) Field of Classification Search
CPC ...... H02K 33/16; H04R 9/066; G06F 3/0488; G06F 3/0416; H04L 43/065; H04W 16/18; H04W 36/00835; H04W 36/20
See application file for complete search history.

(56) References Cited

U.S. PATENT DOCUMENTS

| 2009/0315848 | A1* | 12/2009 | Ku ........................ G06F 3/0416 345/173 |
| 2014/0241182 | A1* | 8/2014 | Smadi ................... H04W 36/20 370/252 |
| 2015/0156581 | A1* | 6/2015 | Efrati ..................... H02K 33/16 381/98 |
| 2017/0005886 | A1* | 1/2017 | Dade ..................... H04L 43/065 |

* cited by examiner

*Primary Examiner* — Kyung H Shin
(74) *Attorney, Agent, or Firm* — ScienBiziP, P.C.

(57) ABSTRACT

A method for notifying an event arising from an electronic device activates a wireless connection between the electronic device and a user-wearable device. A signal intensity of a wireless signal from the wearable device is measured and compared with multiple preset values. The method determines a signal range to which the signal intensity belongs, wherein the multiple preset values define the multiple signal intensity ranges. Notification of an event is issued in the notifying manner corresponding to the intensity range to which the signal intensity belongs.

17 Claims, 3 Drawing Sheets

ELECTRONIC DEVICE AND EVENT NOTIFYING METHOD

CROSS-REFERENCE TO RELATED DISCLOSURES

This disclosure claims priority to Chinese Patent Application No. 201610780310.9 filed on Aug. 31, 2016, the contents of which are incorporated by reference herein.

FIELD

The disclosure generally relates to electronic devices and method for event reminding, and particularly to an electronic device which can automatically select a suitable manner for event notifying according to a distance between a user and the electronic device.

BACKGROUND

Electronic devices such as mobile phones and tablet/personal computers commonly send out event notices by a displaying manner, a vibrating manner, or a ringing manner. The events includes preset events (e.g. a meeting reminder, and a birthday reminder) and real-time events (e.g. a call reminder, a message reminder, and an email reminder). However, the above-mentioned event notifying manners are manually preset by the user.

BRIEF DESCRIPTION OF THE DRAWINGS

Implementations of the present technology will now be described, by way of example only, with reference to the attached figures, wherein.

DETAILED DESCRIPTION

Figure 1:
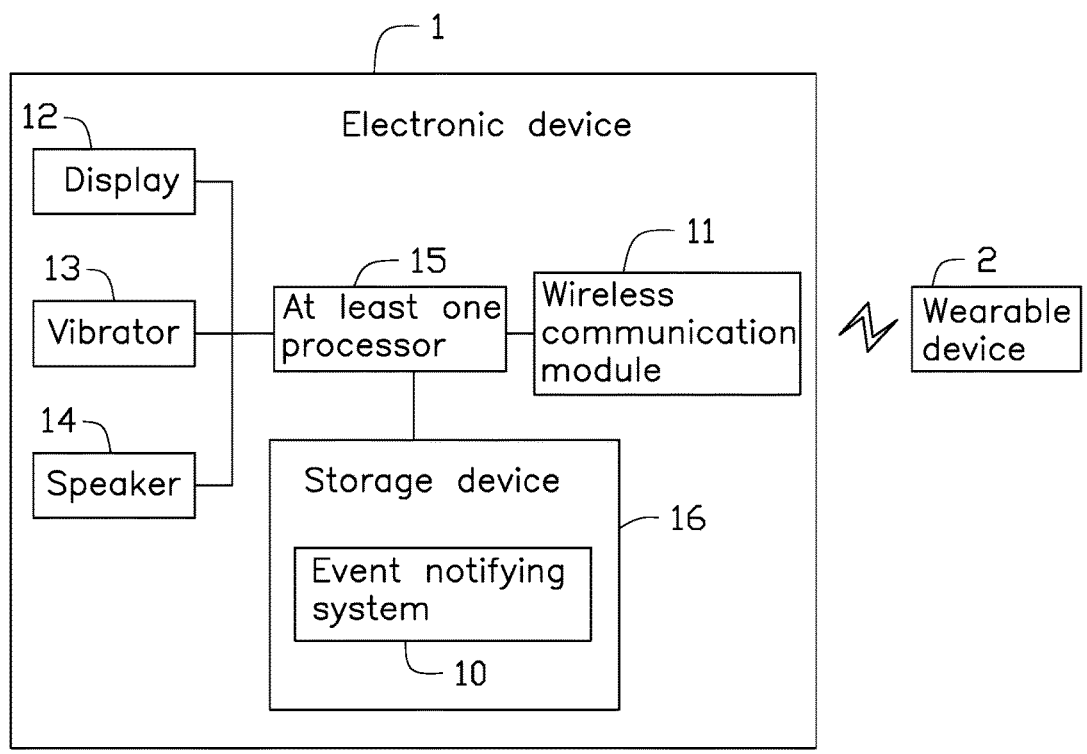
FIG. 1 is a block diagram of an electronic device including an event notifying system, according to an exemplary embodiment of the present application.
Figure 2:
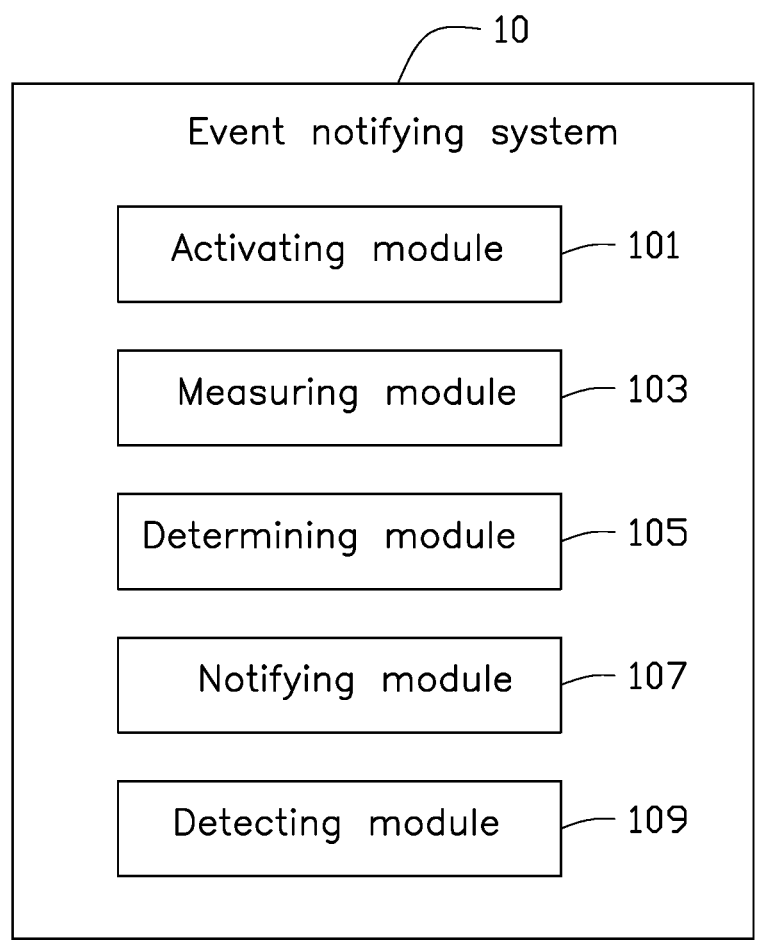
FIG. 2 is a block diagram of the event notifying system of FIG. 1, according to an exemplary embodiment of the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

FIG. 1 is a block diagram of an electronic device 1 including an event notifying system 10, according to an exemplary embodiment of the present application. The system 10 can be installed and operated in the electronic device 1. In at least one embodiment, the electronic device 1 can be a smartphone, a personal digital assistant (PDA), a tablet computer, or other electronic device. The event notifying system 10 can select a manner of providing notification of an event where the manner is appropriate according to a distance between a user and the electronic device 1.

In this exemplary embodiment, a wearable device 2 is worn by a user. The wearable device 2 can establish a wireless connection with the electronic device 1 within a certain distance. Thus, the electronic device 1 and the wearable device 2 can transmit and receive wireless signals with each other. The wearable device 2 can be a smart wristband, a smart watch, or smart glasses. The event notifying system 10 compares signal intensities of the wireless signals with a first preset value and a second preset value and selects the suitable event notifying manner, according to the comparisons. In this exemplary embodiment, the event notifying manners includes first, second, and third manners. Each one of the first manner, the second manner, and the third manner can be one of or a combination of a displaying manner, a vibrating manner, and a ringing manner. In one embodiment, the first manner is the displaying manner, the second manner is the vibrating manner, and the third manner is the ringing manner.

The electronic device 1 further includes a wireless communication module 11, a display 12, a vibrator 13, and a speaker 14. The wireless communication module 11 is configured to establish the wireless connection with the wearable device 2 worn by the user. Thus, the electronic device 1 and the wearable device 2 can transmit and receive wireless signals with each other. The electronic device 1 also can receive calls, messages, and emails via the wireless communication module 11. The display 12, the vibrator 13, and the speaker 14 are configured to support the electronic device 1 to issue notification of the event in the displaying manner, the vibrating manner, and the ringing manner, respectively. Each event can be a preset event (e.g. a meeting reminder or a birthday reminder) or a real time event (e.g. a call reminder, a message reminder, or an email reminder).

The electronic device 1 further includes a storage device 16 providing one or more memory functions, and at least one processor 15. In at least one embodiment, the event notifying system 10 may include computerized instructions in the form of one or more programs, which are stored in the storage device 16 and executed by the at least one processor 15.

The storage device 16 stores one or more programs, such as programs of the operating system, other applications of the electronic device 1, the first and second preset values, and the event notifying system 10. In some embodiments, the storage device 16 may include a memory of the electronic device 1 and/or an external storage card, such as a memory stick, a smart media card, a compact flash card, or any other type of memory card. FIG. 1 illustrates only one example of the electronic device 1, other examples may include more or fewer components than as illustrated, or have a different configuration of the various components.

In at least one embodiment, the event promoting system 10 may include one or more modules, for example, an activating module 101, a measuring module 103, a determining module 105, a notifying module 107, and a detecting module 109. In general, the word "module", as used herein, refers to logic embodied in hardware or firmware, or to a collection of software instructions, written in a programming language, such as Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The activating module 101 can be configured to activate the wireless connection between the electronic device 1 and the wearable device 2. In this exemplary embodiment, the activating module 101 can activate the wireless communication module 11 of the electronic device 1 so that the wireless communication module 11 can establish the wireless connection with the wearable device 2.

The measuring module 103 can be configured to measure the signal intensity of the wireless signal that the electronic device 1 receives from the wearable device 2. The wireless signal can be a BLUETOOTH signal or other wireless signal for short distance communication.

The determining module 105 can be configured to determine whether the signal intensity of the wireless signal is stronger than the first preset value. In this exemplary embodiment, the determining module 105 determines whether RSSI (Received Signal Strength Indication) of the wireless signal is stronger than the first preset value.

The notifying module 107 can be configured to notify the event in the first manner when the determining module 105 determines that the signal intensity of the wireless signal is stronger than the first preset value. This indicates that the user is close to the electronic device 1, for example, the distance between the user and the electronic device 1 is shorter than a first preset distance. In this embodiment, the first manner is the displaying manner, whereby the display 12 of the electronic device 1 displays the event, for example, displays a type, a nature, and a summary of the event.

The determining module 105 can be also configured to further determine whether the signal intensity is stronger than the second preset value when the signal intensity is found weaker than the first preset value.

The notifying module 107 can be also configured to notify the event in the second manner when the determining module 105 determines that the signal intensity of the wireless signal is weaker than the first preset value but stronger than the second preset value. This may occur when the distance between the user and the electronic device 1 is midrange, for example, the distance is longer than a first distance and shorter than a second distance. In this embodiment, the second manner is the vibrating manner whereby the vibrator 12 of the electronic device 1 vibrates to notify the event.

The detecting module 109 can be configured to further detect whether the wireless connection between the electronic device 1 and the wearable device 2 is disconnected or simply very faint, when the intensity signal of the wireless signal is weaker than the second preset value. If the wireless connection is disconnected or very faint, this indicates that is the distance between the user and the electronic device 1 is far, for example, the distance is longer than the second distance. In this case, the notifying module 107 notifies the event in the third manner. In this exemplary embodiment, the third manner is the ringing manner whereby the speaker 14 rings to notify the event. If the wireless connection is not actually disconnected, the determining module 105 again compares the signal intensity of the wireless signal with the first and second preset values, and the notifying module 107 selects the corresponding event notifying manner according to the comparison. The first preset value is larger than the second preset value.

In another embodiment, the first manner is the displaying manner, the second manner is a combination of the displaying manner and the vibrating manner, and the third manner is a combination of the displaying manner, the vibrating manner, and the ringing manner.

In this embodiment, the first and second preset values divide the entire signal intensity range into three signal intensity ranges. Each signal intensity range corresponds to a different event notifying manner. In another embodiment, there can be more or less event notifying manners. For example, N preset values can divide the entire signal intensity range into N+1 signal intensity ranges. Each signal intensity range corresponds to a different event notifying manner. N is a preset positive integer. The determining module 105 compares the signal intensity with the N preset values to determine the signal intensity range to which the signal intensity belongs. The notifying module 107 notifies the event in the event notifying manner corresponding to the signal intensity range to which the signal intensity belongs.

When the signal intensity is weaker or more faint than a smallest preset value of the N preset values, the detecting module 109 further detects whether the wireless connection between the electronic device 1 and the wearable device 2 is actually disconnected. If the wireless connection is disconnected, the notifying module 107 notifies the event in the event notifying manner corresponding to the signal intensity range to which the signal intensity belongs.

In another embodiment, the multiple event notifying manners can be realized by vibrations having different vibration strengths. The vibration strength of the multiple event notifying manners can be inversely proportional to the signal intensity of the wireless signal.

In another embodiment, the multiple event notifying manners can be realized by rings having different volumes. The ring volumes of the multiple event notifying manners can be inversely proportional to the signal intensity of the wireless signal.

For example, in another embodiment, N equals six, thus the entire signal intensity range can be divided into seven signal intensity ranges. Herein, there can be seven event notifying manners corresponding to the seven signal intensity ranges. The seven event notifying manners are the displaying manner, vibration in a low strength, vibration in a moderate strength, vibration in a high strength, ring in a low volume, ring in a moderate volume, and ring in a high volume.

Figure 3:
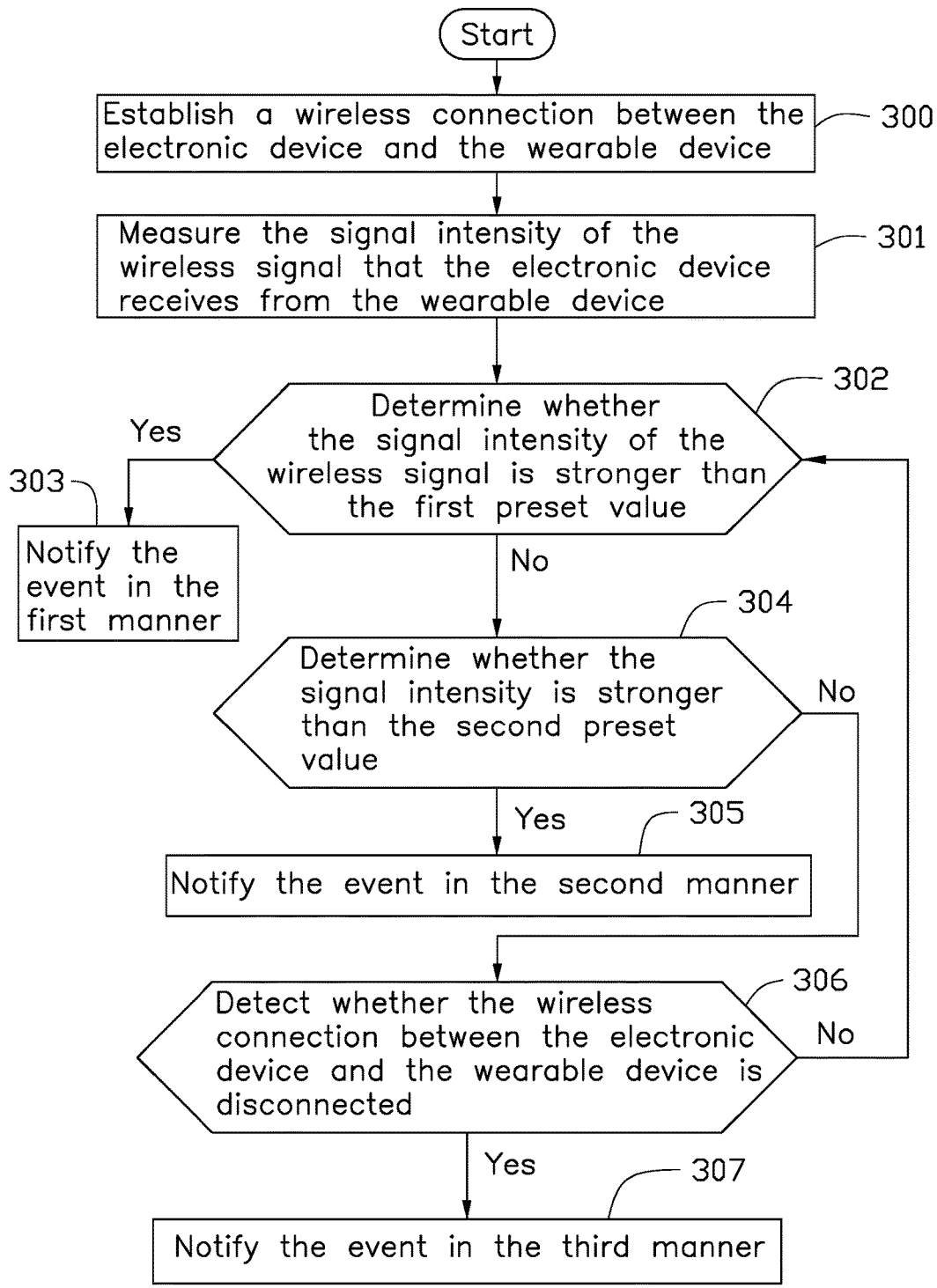
FIG. 3 is a flowchart of an event notifying method using the event notifying system of FIG. 1, according to an exemplary embodiment of the present application.

FIG. 3 is a flowchart of an event notifying method using the event notifying system of FIG. 1, according to an exemplary embodiment of the present application. The example method 600 is provided by way of example, as there are a variety of ways to carry out the method. The method 600 described below can be carried out using the configurations illustrated in FIG. 1, for example, and various elements of these figures are referenced in explaining example method 600. Each block shown in FIG. 3 represents one or more processes, methods, or subroutines, carried out in the exemplary method 600. Furthermore, the illustrated order of blocks is by example only and the order of the blocks can change. Additional blocks may be added or fewer blocks may be utilized, without departing from this disclosure. The exemplary method 600 can begin at block 300.

At block 300, the activating module 101 activates the wireless connection between the electronic device 1 and the wearable device 2. In this exemplary embodiment, the activating module 101 can activate the wireless communication module 11 of the electronic device 1 so that the wireless communication module 11 can establish the wireless connection with the wearable device 2.

At block 301, when the electronic device 1 receives the event, the measuring module 103 measures the signal intensity of the wireless signal that the electronic device 1 receives from the wearable device 2. The wireless signal can be a BLUETOOTH signal or other wireless signal for short distance communication. In this exemplary embodiment, each event can be a preset event (e.g. a meeting reminder or a birthday reminder) or a real time event (e.g. a call reminder, a message reminder, or an email reminder).

At block 302, the determining module 105 determines whether the signal intensity of the wireless signal is stronger than the first preset value, In this exemplary embodiment, the determining module 105 determines whether RSSI (Received Signal Strength Indication) of the wireless signal is stronger than the first preset value. When the determining module 105 determines that the signal intensity of the wireless signal is stronger than the first preset value This indicates that the user is close to the electronic device 1, for example, the distance between the user and the electronic device 1 is shorter than a first preset distance, the procedure goes to block 303. When the determining module 105 determines that the signal intensity of the wireless signal is found weaker than the first preset value, the procedure goes to block 304.

At block 303, the notifying module 107 notifies the event in the first manner. In this embodiment, the first manner is the displaying manner that is the display 12 of the electronic device 1 displays the event, for example, displays a type, nature and summary of event.

At block 304, when the signal intensity is weaker than the first preset value, the determining module 105 further determine whether the signal intensity is stronger than the second preset value. When the signal intensity of the wireless signal is weaker than the first preset value but stronger than the second preset value This may occur when the distance between the user and the electronic device 1 is midrange, for example, the distance is longer than a first distance and shorter than a second distance, the procedure goes to block 305. When the determining module 105 determines that the signal intensity of the wireless signal is weaker than the second preset value, the procedure goes to block 306.

At block 305, the notifying module 107 notifies the event in the second manner. In this embodiment, the second manner is the vibrating manner that is the vibrator 12 of the electronic device 1 vibrates to notify the event.

At block 306, the detecting module 109 detects whether the wireless connection between the electronic device 1 and the wearable device 2 is disconnected or simply very faint when the intensity signal of the wireless signal is weaker than the second preset value. If the wireless connection is disconnected or very faint, this indicates that is the distance between the user and the electronic device 1 is relative far, for example, the distance is longer than the second distance. In this case the procedure goes to block 307. If the wireless connection is not actually disconnected, the procedure goes back to block 302. The determining module 105 again compares the signal intensity of the wireless signal with the first and second preset values, and the notifying module 107 selects the corresponding event notifying manner according to the comparison. The first preset value is larger than the second preset value.

At block 307, the notifying module 107 notifies the event in the third manner. In this exemplary embodiment, the third manner is the ringing manner whereby the speaker 14 rings to notify the event.

In another embodiment, the first manner is the displaying manner, the second manner is a combination of the displaying manner and the vibrating manner, and the third manner is a combination of the displaying manner, the vibrating manner, and the ringing manner.

In this embodiment, the first and second preset values divide the entire signal intensity range into three signal intensity ranges. Each signal intensity range corresponds to a different event notifying manner. In another embodiment, there can be more or less event notifying manners. For example, N preset values can divide the entire signal intensity range into N+1 signal intensity ranges. Each signal intensity range corresponds to a different event notifying manner. N is a preset positive integer. The determining module 105 compares the signal intensity with the N preset values to determine the signal intensity range to which the signal intensity belongs. The notifying module 107 notifies the event in the event notifying manner corresponding to the signal intensity range to which the signal intensity belongs.

When the signal intensity is weaker or more faint than a smallest preset value of the N preset values, the detecting module 109 further detects whether the wireless connection between the electronic device 1 and the wearable device 2 is actually disconnected. If the wireless connection is disconnected, the notifying module 107 notifies the event in the event notifying manner corresponding to the signal intensity range to which the signal intensity belongs.

In another embodiment, the multiple event notifying manners can be realized by vibrations having different vibration strengths. The vibration strength of the multiple event notifying manners can be inversely proportional to the signal intensity of the wireless signal.

In another embodiment, the multiple event notifying manners can be realized by rings having different volumes. The ring volumes of the multiple event notifying manners can be inversely proportional to the signal intensity of the wireless signal.

For example, in another embodiment, N equals six, thus the entire signal intensity range can be divided into seven signal intensity ranges. Herein, there can be seven event notifying manners corresponding to the seven signal intensity ranges. The seven event notifying manners are the displaying manner, vibration in a low strength, vibration in a moderate strength, vibration in a high strength, ring in a low volume, ring in a moderate volume, and ring in a high volume.

The event notifying method, system 10 and electronic device 1 can select the suitable event notifying manner according to the distance between the user and the electronic device 1. Thus, the event notifying manner is flexible and intelligent.

The embodiments shown and described above are only examples. Many details are often found in the art such as the other features. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electronic device comprising:
a processor; and
a storage device configured to store one or more programs which, when executed by the processor, cause the processor to:
activate a wireless connection between the electronic device and a wearable device;
measure a signal intensity of a wireless signal that the electronic device receives from the wearable device when the electronic device receives an event;
compare the signal intensity with multiple preset values and determine to which signal range the signal intensity belongs, wherein there are N preset values which divide the entire signal intensity range into N+1 signal intensity ranges, each signal intensity range corresponds to a different event notifying manner, N being a preset positive integer and wherein the measurement of the event notifying manner such as ring volume and vibration strength is inversely proportional to the intensity of the selected signal; and
notify the event in the event notifying manner corresponding to the intensity range to which the signal intensity belongs.

2. The electronic device according to claim 1, wherein the processor further:
detect whether the wireless connection between the electronic device and the wearable device is disconnected when the signal intensity is weaker than a smallest preset value of the preset values; and
notify the event in the event notifying manner corresponding to the signal intensity range to which the signal intensity belongs if the wireless connection is disconnected.

3. The electronic device according to claim 1, wherein the event notifying manners comprise a plurality of vibrating manners, vibration strengths of the multiple vibrating manners are inversely proportional to the signal intensity of the wireless signal.

4. The electronic device according to claim 1, wherein the event notifying manners comprise a plurality of ringing manners, ring volumes of the multiple ringing manners are inversely proportional to the signal intensity of the wireless signal.

5. The electronic device according to claim 1, wherein the event notifying manner comprises at least one of a displaying manner, a vibrating manner, and a ringing manner.

6. The electronic device according to claim 5, wherein the electronic device further comprises a display, wherein in the displaying manner, the display of the electronic device displays a type, a nature and a summary of the event.

7. A computer-implemented method comprising:
activating a wireless connection between an electronic device and a wearable device;
measuring a signal intensity of a wireless signal that the electronic device receives from the wearable device when the electronic device receives an event;
comparing the signal intensity with multiple preset values and determine to which signal range the signal intensity belongs, wherein there are N preset values which divide the entire signal intensity range into N+1 signal intensity ranges, each signal intensity range corresponds to a different event notifying manner, N being a preset positive integer and wherein the measurement of the event notifying manner such as ring volume and vibration strength is inversely proportional to the intensity of the selected signal; and
notifying the event in the event notifying manner corresponding to the intensity range to which the signal intensity belongs.

8. The method according to claim 7, further comprising:
detecting whether the wireless connection between the electronic device and the wearable device is disconnected when the signal intensity is weaker than a smallest preset value of the preset values; and
notifying the event in the event notifying manner corresponding to the signal intensity range to which the signal intensity belongs if the wireless connection is disconnected.

9. The method according to claim 7, wherein the event notifying manners comprise a plurality of vibrating manners, vibration strengths of the multiple vibrating manners are inversely proportional to the signal intensity of the wireless signal.

10. The method according to claim 7, wherein the event notifying manners comprise a plurality of ringing manners, ring volumes of the multiple ringing manners are inversely proportional to the signal intensity of the wireless signal.

11. The method according to claim 7, wherein the event notifying manner comprises at least one of a displaying manner, a vibrating manner, and a ringing manner.

12. The electronic device according to claim 11, wherein in the displaying manner, a display of the electronic device displays a type, a nature and a summary of the event.

13. A non-transitory storage medium having stored instructions that, when executed by a processor of an electronic device, cause the electronic device to perform a method for notifying an event of the electronic device, the method comprising:
activating a wireless connection between the electronic device and a wearable device;
measuring a signal intensity of a wireless signal that the electronic device receives from the wearable device when the electronic device receives an event;
comparing the signal intensity with multiple preset values and determine to which signal range the signal intensity belongs, wherein there are N preset values which divide the entire signal intensity range into N+1 signal intensity ranges, each signal intensity range corresponds to a different event notifying manner, N being a preset positive integer and wherein the measurement of the event notifying manner such as ring volume and vibration strength is inversely proportional to the intensity of the selected signal; and
notifying the event in the event notifying manner corresponding to the intensity range to which the signal intensity belongs.

14. The non-transitory storage medium according to claim 13, further comprising:
detecting whether the wireless connection between the electronic device and the wearable device is disconnected when the signal intensity is weaker than a smallest preset value of the preset values; and
notifying the event in the event notifying manner corresponding to the signal intensity range to which the signal intensity belongs if the wireless connection is disconnected.

15. The non-transitory storage medium according to claim 13, wherein the event notifying manners comprise a plurality of vibrating manners, vibration strengths of the multiple vibrating manners are inversely proportional to the signal intensity of the wireless signal.

16. The non-transitory storage medium according to claim 13, wherein the event notifying manners comprise a plurality of ringing manners, ring volumes of the multiple ringing manners are inversely proportional to the signal intensity of the wireless signal.

17. The non-transitory storage medium according to claim 13, wherein the event notifying manner comprises at least one of a displaying manner, a vibrating manner, and a ringing manner.

* * * * *